(12) United States Patent
Köhler

(10) Patent No.: US 6,655,903 B2
(45) Date of Patent: Dec. 2, 2003

(54) METHOD FOR STACKING CONTAINERS OF THERMOPLASTIC MATERIAL AND DEVICE FOR REALIZING SAME

(75) Inventor: Hans Köhler, Heilbronn (DE)

(73) Assignee: Adolf Illig Maschinenbau GmbH & Co., Heilbronn (DE)

( * ) Notice: Subject to any disclaimer, the term of this patent is extended or adjusted under 35 U.S.C. 154(b) by 131 days.

(21) Appl. No.: 09/947,927

(22) Filed: Sep. 7, 2001

(65) Prior Publication Data

US 2002/0028129 A1 Mar. 7, 2002

(30) Foreign Application Priority Data

Sep. 7, 2000 (DE) .......................... 100 44 228

(51) Int. Cl.⁷ ............................... B65G 57/30
(52) U.S. Cl. ................ 414/802; 414/790.3; 414/795.3; 414/788.2
(58) Field of Search ................ 414/788.2, 790.3, 414/794.9, 795.3, 798.4; 802/798.7

(56) References Cited

U.S. PATENT DOCUMENTS

| 2,603,363 A | 7/1952 | Bongiovanni | |
| 5,234,313 A | 8/1993 | DelDuca | 414/798.4 |
| 5,273,167 A | 12/1993 | Haas et al. | 209/591 |
| 6,241,457 B1 * | 6/2001 | Hüttig et al. | 414/788.2 |
| 6,439,828 B1 * | 8/2002 | Lauermann | 414/788.2 |
| 2002/0114691 A1 * | 8/2002 | Trautwein et al. | 414/789.8 |

FOREIGN PATENT DOCUMENTS

| DE | AS27 14 352 | 6/1978 |
| DE | 3346628 C2 | 7/1985 |
| DE | 29608477.8 | 9/1997 |
| DE | 19852359.9 | 10/1998 |
| DE | 19812414 A1 | 9/1999 |
| DE | 198 48 628 A1 | 4/2000 |
| GB | 1039064 | 8/1966 |

* cited by examiner

Primary Examiner—Janice L. Krizek
(74) Attorney, Agent, or Firm—Venable LLP; Norman N. Kunitz

(57) ABSTRACT

The invention considerably reduces the danger of deformation for containers made from a thermoplastic material during the transfer to a stacking magazine or into a locally fixed catch plate. This deformation danger results from the fact that the formed stack must be displaced within a short time by the stack distance, either through the transferred containers themselves or by components of a catch plate that is moved forward with each cycle. This is achieved through displacing the stacks in the stacking magazines or the locally fixed catch plate with a displacement device. The displacement device can be combined with the stack removal device or can be a separate displacement device. According to a modification of the invention, the method is intended to improve the cooling of the stacked containers.

8 Claims, 4 Drawing Sheets

METHOD FOR STACKING CONTAINERS OF THERMOPLASTIC MATERIAL AND DEVICE FOR REALIZING SAME

CROSS REFERENCE TO RELATED APPLICATION

This application claims the priority of German patent Application No. 100 44 228.5 filed Sep. 7, 2000, which is incorporated herein by reference.

BACKGROUND OF THE INVENTION

The invention relates to a method for stacking containers of thermoplastic material, which are molded from/punched out of a heated foil web in a molding/punching tool and are transferred from this tool, either directly or indirectly, via a transfer device to a stacking magazine or to a catch plate and are removed from there as a container stack. The invention furthermore relates to a device for realizing this method.

Containers that are molded and punched out in a thermal molding machine with a combination molding and punching tool are generally transferred after ejection from the molding/punching tool to stacking magazines. This can occur directly by displacing the molding tool bottom and then transferring the containers to the stacking magazines where they are retained. A method of this type is disclosed in the German patent DE 33 46 628 C2.

A method of transferring containers with a transfer device that grips the ejected containers and, following a rotation of 180°, inserts these into the stacking magazines is furthermore disclosed in the German patent reference DE 198 52 359 A1. A non-rotating transfer device, meaning for a linear conveyance of the items, which uses a catch plate is known from the German patent reference DE 198 12 414 A1. One container is picked up during each cycle and is transferred to a stacking magazine.

The German patent reference DE 198 48 628 A1 also discloses the use of a catch plate, in which complete container stacks are formed, however, which are then transferred to a stacking magazine. The stacking magazine is then guided to a transfer location for successively conveying all stacks.

The German patent DE-AS 27 14 352 also discloses the stacking of several containers in a catch plate. The container stacks are then gripped and conveyed further with a transfer device consisting of rods.

With all these known methods, the containers forming a stack in a catch plate or a stacking magazine are displaced upon the insertion of the following container by a measure or distance that corresponds to the stack measure, meaning the distance between two neighboring stacked containers. This forward movement of the container stacks is realized in the German patent reference DE 198 12 414 A1 with the gripping elements in the shape of mandrels, which impact with points along the edge of the container that is stacked in last and thus cause the container stack to advance when the new container is transferred to the stacking magazine.

Cycle numbers of up to and exceeding 40 cycles/minute are achieved with modern automatic thermal molding machines, meaning little time is available for stacking the containers and these must consequently be stacked very quickly. In particular, this is true when stacking containers directly into stacking magazines or a locally fixed catch plate. Advancing the existing container stacks by the distance measure must occur during an interval in the order of magnitude of 0.1 seconds, which is necessary for reaching a cycle time of 1.5 seconds with 40 cycles per minute for the following processing steps: molding-cooling down-punching out-opening the tool-ejecting-closing the tool. In addition, the containers must be removed from the mold while still relatively warm, which is possible in principle, depending on the material type and thickness, but carries the danger that the containers are deformed by a mechanical force effect. This force effect occurs because the containers are moved at the bottom through the displaceable mold bottom of the molding/punching tool and hit the stack edge of the previously stacked containers with the container edge. Depending on the number of previously stacked containers and their weight, a force corresponding to the product of weight×acceleration (K=m×b) must be generated and must be absorbed by the container edge and the side walls of the container, up to the mold bottom. In particular with thin-walled containers, which permit a high cycle number due to their rapid cooling inside the molding tool, the danger of deformation of the containers is high and increases with the length of the container stack. In practical operations, the deformation danger limits the number of cycles for the device.

If the containers are advanced with the aid of the mandrels on the catch plate that is moved with each cycle (DE 198 12 414 A1), the container wall and the container bottom do not need to absorb a force during the stacking. However, the complete force for advancing a container stack now becomes effective at three or four points along the edge of the previously stacked container. The container has cooled only slightly in these 1.5 seconds, even though a cycle has passed in the meantime, so that with this forward movement of the stack, the danger of deformation at several points along the container edge exists. The driving speed of the catch plate is reduced relative to the mold bottom speed, but is still relatively high. During the available 1.5 seconds, a total distance of approximately 400 mm—back and forth—must be traversed. Even if a slower movement sequence in the end position of the catch plate movement is included in the calculation, a time in the order of magnitude of 0.3 seconds results for the actual stack lift of approximately 8 mm.

As a result of the relatively rapid stacking of containers with the known methods, as well as the associated acceleration of the complete, previously formed container stack, the danger exists that with flat containers, these will drift apart and the complete stack will thus disintegrate.

Thus, it is the object of the invention to design the method such that when transferring containers that are still warm and/or thin-walled to stacking magazines or a locally fixed catch plate, these are not deformed and do not drift apart during the stack formation, despite high cycle numbers.

SUMMARY OF THE INVENTION

The above object generally is achieved according to a first aspect of the invention by a method for forming a stack of containers of a thermoplastic material, which are molded from/punched out of a heated foil web in a molding/punching tool, which method comprises: transferring containers consecutively from the tool, either directly or indirectly, via a transfer device to a first position within one of a stacking magazine and a catch plate; using a displacement device that is separate from the transfer device, consecutively displacing each container in an axial direction of the stacking magazine or catch plate from the first position by a distance at least equal to a distance between two adjacent containers of a stack of containers to a second position within the stacking magazine or catch plate to form a stack of containers at the second position, and displace any stack of containers at the second position by at least the distance between two adjacent containers of a stack; and, subsequently axially removing the stack of containers from the stacking magazine or catch plate.

Owing to the fact that the container stacks in the stacking magazines or the locally fixed catch plate are moved with a displacement device, the displacement can occur at a slow speed and thus with little force effect on the last containers that are stacked in. For example, with a cycle number of 40/min, the displacement device has 1.5 seconds to traverse a distance in the order of 2×8 mm (back and forth). Compared to the known method with movable catch plate, a displacement device can take 10 times longer and the displacement can occur at a correspondingly slower speed. The displacement by the stack measure can occur with a separate displacement unit, which only serves this purpose. The stack can be removed with a second device that is known per se, e.g., consisting of rods, once the predetermined number of containers per stack is reached.

However, the container stack can also be displaced by the stack measure with a device for removing the stacks from the stacking magazines or the locally fixed catch plate. The expenditure for this operation is low because it requires only a corresponding drive with varied lift and an adaptation of the control. However, the fact that the time needed for removing the container stacks exceeds the cycle time presents a problem. Thus, two or three containers are stacked in during the removal, without intermediate displacement of the stack measure. For the most part that is non-critical because these few containers have a low weight and no deformation must be feared. The danger only increases with a higher number of containers in the container stack.

This method also makes it possible to displace the container stack inside the stacking magazines or the locally fixed catch plate by a measure exceeding the stack measure without substantially increasing the deformation danger. As a result, it is possible to have a distance between the last container stacked in and the container stack, which is in the order of magnitude of two times to three times the stack dimension. This free-standing feature favors the cooling down of the last-stacked container on the inside surface and the last container of the stack on the outside surface, which can be improved by blowing—preferably cooled and/or sterilized—air onto both surfaces via jets. It has turned out that the containers are still relatively warm with this high cycle number and—if stacked one inside the other—don't cool down well. The above-mentioned cooling step clearly improves the cooling.

The above object generally is achieved according to a second aspect of the invention by an apparatus that is connected downstream of a molding machine and comprises stacking magazines or a catch plate, into which the containers can be stacked directly or indirectly from the molding/punching tool or via a transfer device, and a stack displacement device for displacing all container stacks, which displacement device is connected to a drive and is effective with each cycle of the molding machine, said device being arranged in the region of the intake opening of the stacking magazine or the catch plate.

The method is described in further detail with schematic drawings of the device.

DETAILED DESCRIPTION OF THE PREFERRED EMBODIMENTS

Figure 1:
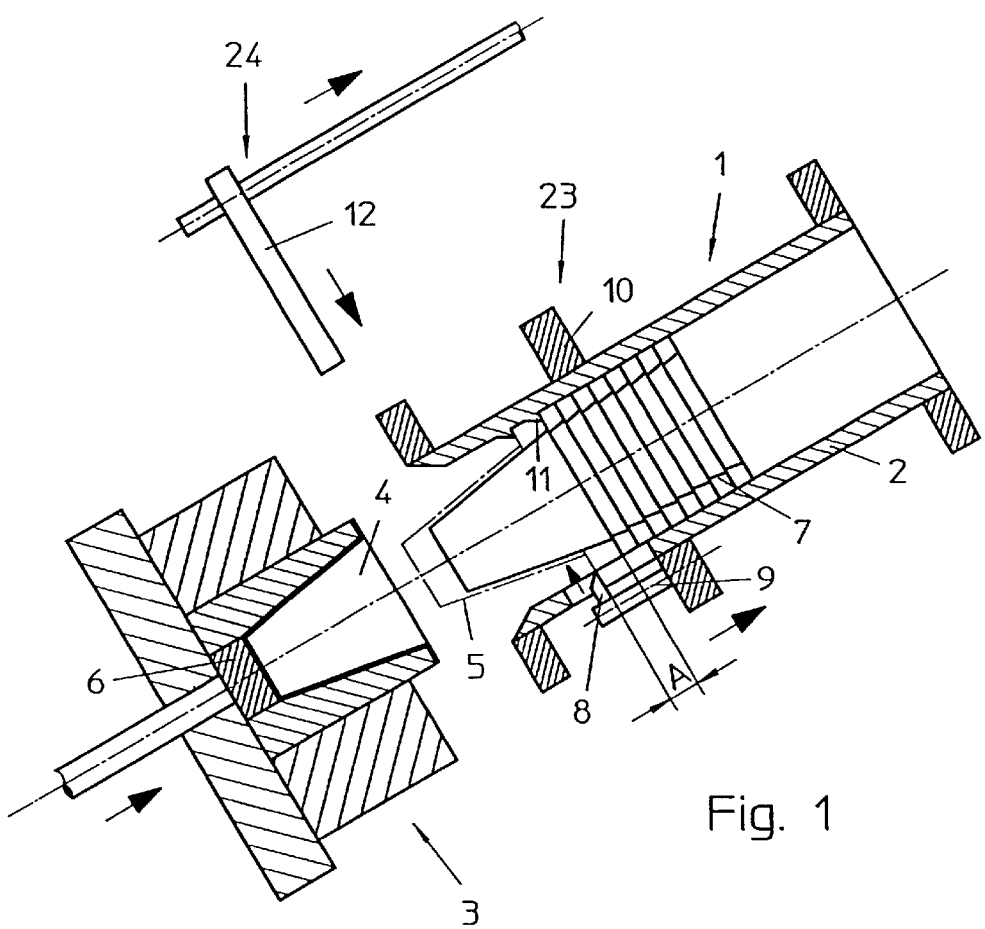
FIG. 1 shows a first variant of a stacking magazine with a displacement device according to the invention and a separate stack removal device.

FIG. 1 shows a first embodiment of the device in the form of a single-track stacking magazine 2, for which the method is used. The stacking magazine 2 is positioned at a slant or incline and the lower part 3 of a molding/punching tool is moved underneath its lower opening. Molded and punched out containers 5 are ejected from the cavities 4 of the molding/punching tool by means of the displaceable mold bottom 6, which serves as a transfer device. The containers thus are placed into the stacking magazine 2 at a first position, which guides and centers the containers 5 locally or all around. The position of a newly stacked-in container 5, i.e., the first position, is shown with a dash-dot line in FIG. 1. Retaining elements become effective in this position, which hold the container 5 back during the return movement of the mold bottom 6. These retaining elements can be arranged on the stacking magazine 2 and take the form of solid elements such as brushes, catches, flaps, springy contact, elements or connected retaining elements.

FIG. 1 shows a stack displacement device 23, for which the retaining elements 8 extend radially inwardly in the direction of the arrow when activated and are mounted on rods 9 that extend in the stacking direction, i.e., the axial direction of the magazine 2, and that are fastened to a plate 10 that can be displaced in the stack direction. Retaining element designs of this type are known, for example, from the reference DE-AS 27 14 352 and are therefore not described in further detail herein.

Once the retaining elements 8 are extended, the plate 10 and the rods 9 are displaced by the distance A in the stacking direction, wherein the distance A corresponds at least to the distance (stack measure) between two adjacent containers 5. As a result of this movement, each container 5 that is last stacked in is displaced by the distance A. Retaining elements 11, formed, for example, on the inner surface of the magazine 2, hold the container stack 7 if the rods 9 and the plate 10 again return to the starting position—with pulled-back retaining elements 8—and await the stacking in of the following container 5. Between two cycles of the molding machine, there is sufficient time even with 40 cycles/minute to carry out this slight lift by the distance A at a relatively slow speed. As a result, only a low force is exerted onto the container edge. Following the advancing of a container stack 7 by the distance A, there is sufficient space to insert the newly stacked-in container 5 into the stacking magazine 2, without a force being exerted on it.

A stack removal device 24 according to the example shown in FIG. 1 serves to remove the formed container stacks 7. This device consists of a rake 12 that, following a transverse movement to engage the bottom half of the stack 7, is displaced in the stacking direction and guides the container stacks 7 out of the stacking magazine 2 for an optional further treatment/processing. Where required, the parts of the stacking magazine 2 are accordingly slotted, so that the rake 12 can be extended through.

Figure 2:
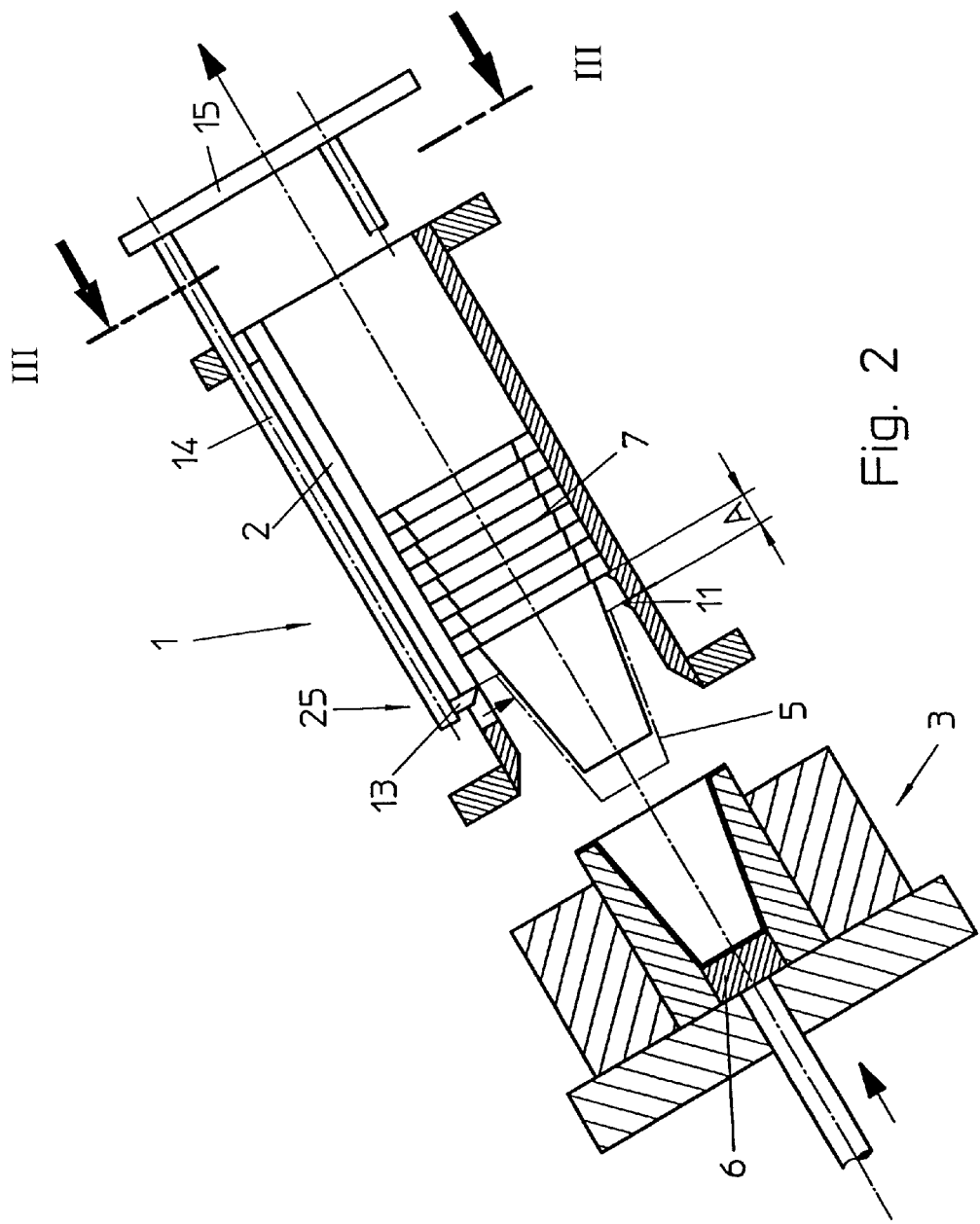
FIG. 2 shows a second variant of a stacking magazine with combination stack removal/stack displacement device, shown as a sectional view along the line II—II in FIG. 3.

FIG. 2 shows a different solution for realizing the method, using a stack displacement device 25 for the container stacks 7. The retaining elements 13 that can be radially actuated are mounted on rods 14, which are longer than the stacking magazine 2 and are attached to a plate 15. This plate 15 can be displaced in the stacking direction with a non-depicted drive. That is to say, it can be displaced by the distance A, as well as by a large lift. Following the stacking of a container 5, the rods 14 perform a lift by the distance A for each cycle, which results in moving the container stacks 7 forward. Once all container stacks 7 have reached a predetermined length/number, a large lift is triggered for removing the entire container stack 7 from the stacking magazine 2. The container stacks 7 are then transported to additional processing devices.

Figure 3:
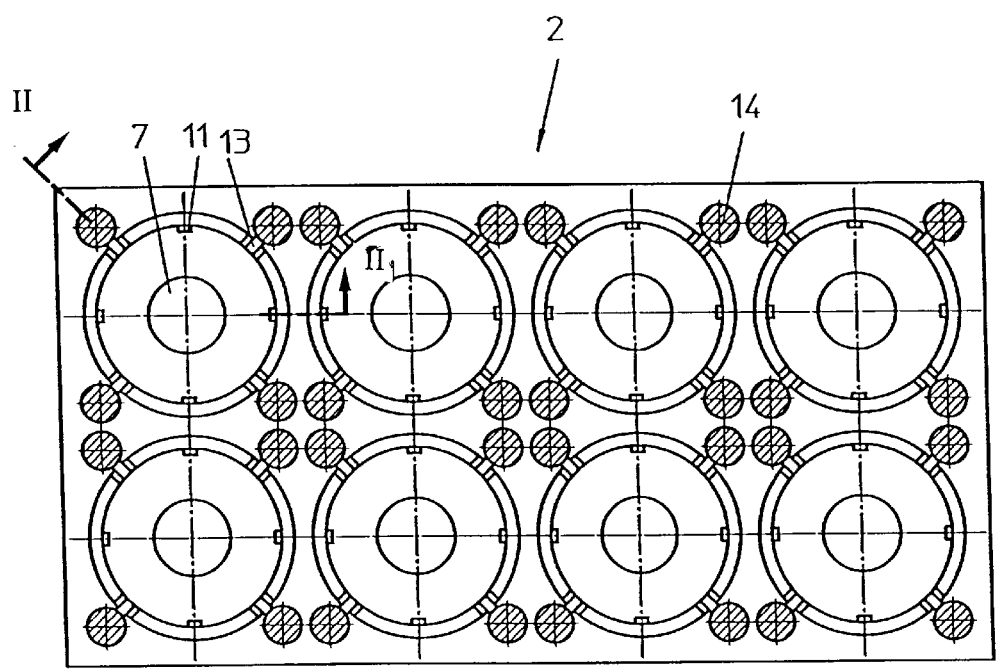
FIG. 3 is a view from above of a stacking magazine according to FIG. 2, shown along the line III—III in FIG. 2, which is configured with two tracks.

The time for removing the container stacks 7 exceeds one cycle of the molding machine, meaning two or three containers 5 are stacked into the stacking magazine 2 during this interval. However, this does not cause a heavy force to be exerted upon the second or, if necessary, third container 5, since these containers weigh little. The solution according to FIG. 2 has the advantage that only one drive is required for the two different movements and that its use with a multi-track design of the molding/punching tool is more advantageous for space reasons. FIG. 3 shows a view from above of a stacking magazine 2 designed with two tracks, which shows the position of the rods 14 (four rods for each container stack 7).

FIGS. 1 and 2 show the containers 5 being stacked directly from the bottom part 3 of a molding/punching tool. The invention can be used in the same way if the container 5 is first transferred to a transfer device in the form of a suction plate, a catch plate or a turning device, which then inserts the containers 5, if necessary with the bottom first, into the stacking magazine 2.

Figure 4:
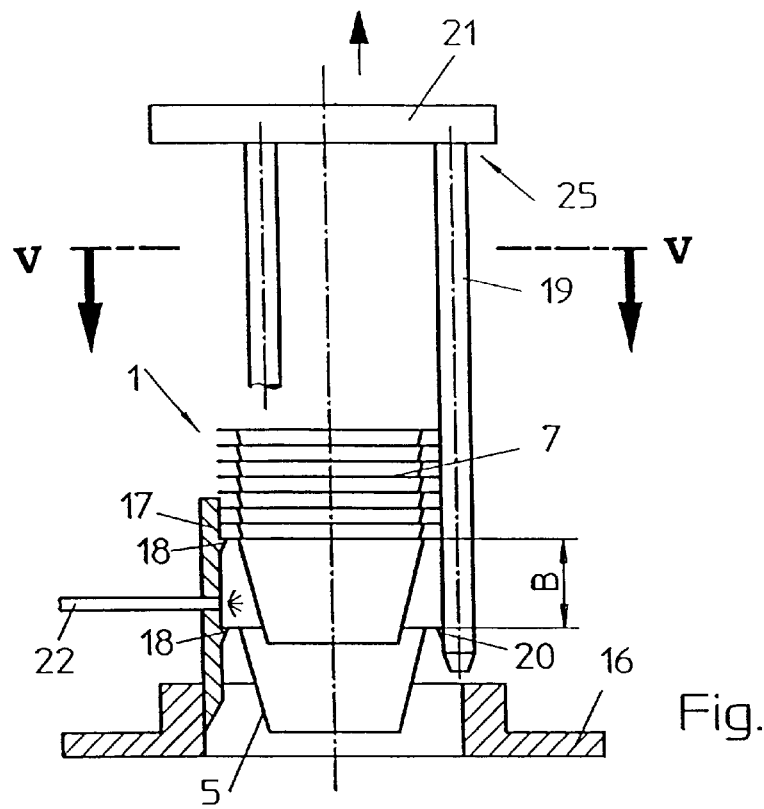
FIG. 4 shows a stacking plate with a combination stack removal/stack displacement device, shown with one row.
Figure 5:
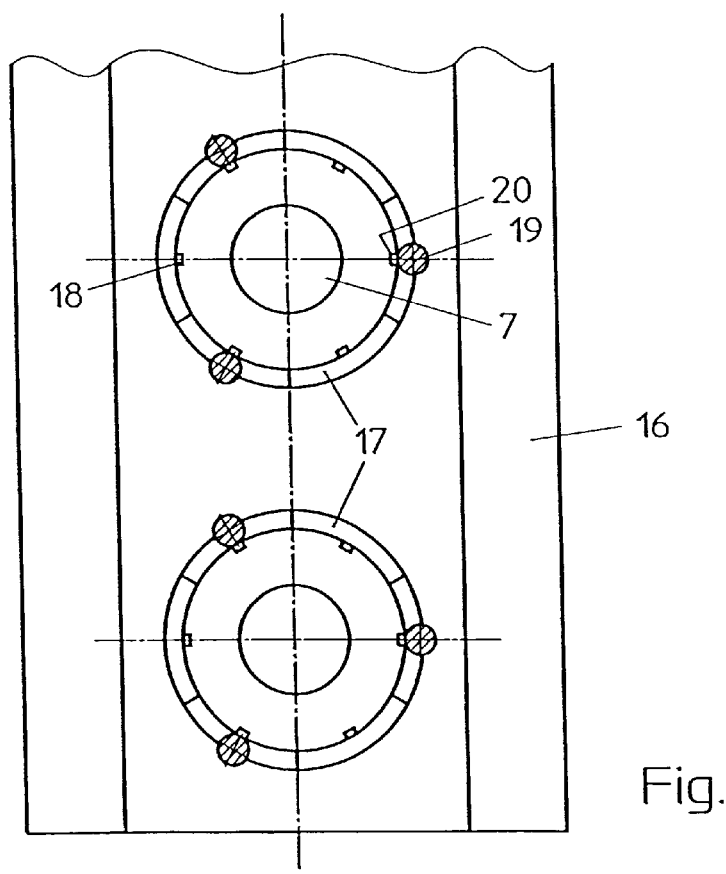
FIG. 5 is a view from above of the stacking plate according to FIG. 4, a sectional view V—V in FIG. 4.

The method according to the invention can furthermore be used if only a locally fixed catch plate 16 with short guides is used in place of a complete stacking magazine 2, in particular for the vertical stacking, because the containers 5 center themselves in the container stack 7, thus making the stack more rigid. In particular, this is true if the stack displacement device is also designed as stack removal device with individual guide parts for the container stack 7. FIGS. 4 and 5 show an embodiment of this type, with a single row for the molding/punching tool 3. Guide parts 17 for the stacked in containers 5 rest on a locally fixed catch plate 16. These guide parts are provided locally with retaining elements 18 for holding the stacked-in containers 5. Retaining elements 20 that can be actuated sit on the rods 19, wherein all rods 19 are attached to the holding plate 21 that can be displaced in stacking direction.

The lower retaining elements 18 accept the last stacked container 5, the retaining elements 20 are extended and the rods 19 perform by the distance B, which is larger for the exemplary embodiment shown than the stack distance for containers 5. As a result, a distance matching the distance B is generated between the last stacked in container 5 and the last container in the stack 7, thus improving the cooling of the last stacked-in container 5 and the lowest container 5 of stack 7. Blowing preferably cooled and/or sterilized air into this gap with nozzles 22 will further positively influence the cooling.

The rods 19 form a guide for the growing container stack 7. During the removal transport of container stack 7, following a large lift of rods 19, a few containers 5 with correspondingly adjusted length are again pushed into the guide elements 17.

The invention now being fully described, it will be apparent to one of ordinary skill in the art that many changes and modifications can be made thereto without departing from the spirit or scope of the invention as set forth herein.

What is claimed is:

1. A method for forming a stack of containers of a thermoplastic material, which are molded from/punched out of a heated foil web in a molding/punching tool, comprising: transferring containers consecutively from the tool, via a transfer device to a first position within one of a stacking magazine and a catch plate; using a displacement device that is separate from the transfer device, consecutively displacing each container in an axial direction of the stacking magazine or catch plate from the first position by a displacement distance at least equal to a distance between two adjacent containers of a stack of containers to a second position within the stacking magazine or catch plate to form a stack of containers at the second position, and displacing any stack of containers at the second position by at least the distance between two adjacent containers of a stack; and, subsequently axially removing the stack of containers from the stacking magazine or catch plate.

2. A method according to claim 1, including using a combination stack removal/stack displacement device to displace and to remove the container stack.

3. A method according to claim 1, including using a stack removal device that is separate from the displacement device to remove the container stack.

4. A method of forming a stack of containers according to claim 1, wherein said step of consecutively displacing is carried out between two consecutive cycles of the molding/punching tool.

5. A method of forming a stack of containers according to claim 1, wherein said step of consecutively displacing each container is carried out separately for each container in said first position.

6. A method for forming a stack of containers according to claim 1 wherein the displacement distance is larger than the distance between two adjacent containers of a stack of containers.

7. A method according to claim 6 further comprising blowing air into a gap between the last stacked-in container at the first position and the container stack.

8. A method according to claim 7, wherein the air is at least one of cooled and sterilized.

* * * * *